(12) United States Patent
Choi et al.

(10) Patent No.: US 11,449,544 B2
(45) Date of Patent: Sep. 20, 2022

(54) VIDEO SEARCH DEVICE, DATA STORAGE METHOD AND DATA STORAGE DEVICE

(71) Applicant: HANWHA TECHWIN CO., LTD., Seongnam-si (KR)

(72) Inventors: Jae Won Choi, Seongnam-si (KR); Jeong Hun Lee, Seongnam-si (KR); Kye Won Kim, Seongnam-si (KR); Ji Man Kim, Seongnam-si (KR); Sang Wook Lee, Seongnam-si (KR); Jong Hyeok Lee, Seongnam-si (KR); Jae Woon Byun, Seongnam-si (KR); Ho Jung Lee, Seongnam-si (KR); Jin Hyuk Choi, Seongnam-si (KR); Sweung Won Cheung, Seongnam-si (KR); Yeon Woo Kim, Seongnam-si (KR); Jin Yoon, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 334 days.

(21) Appl. No.: 16/418,334

(22) Filed: May 21, 2019

(65) Prior Publication Data

US 2019/0272289 A1 Sep. 5, 2019

Related U.S. Application Data

(63) Continuation of application No. PCT/KR2016/015051, filed on Dec. 21, 2016.

(30) Foreign Application Priority Data

Nov. 23, 2016 (KR) .................. 10-2016-0156614

(51) Int. Cl.
*G06F 16/73* (2019.01)
*G06F 16/738* (2019.01)
(Continued)

(52) U.S. Cl.
CPC .............. *G06F 16/73* (2019.01); *G06F 16/00* (2019.01); *G06F 16/739* (2019.01);
(Continued)

(58) Field of Classification Search
CPC ........ G06F 16/73; G06F 16/00; G06F 16/739; G06F 16/7837; H04N 21/232; H04N 5/77;
(Continued)

(56) References Cited

U.S. PATENT DOCUMENTS

2012/0140982 A1* 6/2012 Sukegawa ............ G06K 9/6255
382/103
2014/0104456 A1* 4/2014 Wang .................. H04N 5/23218
348/231.2

(Continued)

FOREIGN PATENT DOCUMENTS

EP 2 290 566 A1 3/2011
KR 10-0471927 B1 3/2005
(Continued)

OTHER PUBLICATIONS

Search Report dated Aug. 21, 2017, issued by the International Searching Authority in International Application No. PCT/KR2016/015051 (PCT/ISA/210).
(Continued)

*Primary Examiner* — Loi H Tran
(74) *Attorney, Agent, or Firm* — Sughrue Mion, PLLC

(57) ABSTRACT

Disclosed herein is a video search device comprising: at least one processor configured to implement an updating unit generating event object information based on feature information on an object detected in a video; and a storage configured to store comparison object information containing feature information on a reference object, wherein the processor is further configured to implement: an object
(Continued)

information generating/deleting unit configured to create information on an object having a predetermined degree of similarity between the event object information and the comparison object information as final object information, and storing the final object information in the storage; and a data searching unit searching the final object information for data that satisfies a search criterion entered by a user.

17 Claims, 11 Drawing Sheets

(51) Int. Cl.
```
G06K 9/62      (2022.01)
G06F 16/00     (2019.01)
H04N 21/232    (2011.01)
H04N 5/77      (2006.01)
G06T 7/00      (2017.01)
G06V 20/40     (2022.01)
H04N 7/18      (2006.01)
```
(52) U.S. Cl.
CPC .............. *G06K 9/6215* (2013.01); *G06T 7/00* (2013.01); *G06V 20/46* (2022.01); *H04N 5/77* (2013.01); *H04N 21/232* (2013.01); *H04N 7/18* (2013.01)

(58) Field of Classification Search
CPC . H04N 7/18; H04N 7/181; G06T 7/00; G06T 7/73; G06K 9/00744; G06K 9/6215; G06K 9/00369; G06K 9/00711

USPC .......................................................... 707/706
See application file for complete search history.

(56) References Cited

U.S. PATENT DOCUMENTS

| | | | |
|---|---|---|---|
| 2014/0355823 A1* | 12/2014 | Kwon ................ | G06K 9/00711 382/103 |
| 2015/0029222 A1* | 1/2015 | Hofmann ............. | G06K 9/6202 345/633 |
| 2016/0070962 A1* | 3/2016 | Shetty ................ | G06K 9/00765 382/225 |
| 2018/0189423 A1* | 7/2018 | Nonaka ............ | G06Q 10/06316 |

FOREIGN PATENT DOCUMENTS

| | | |
|---|---|---|
| KR | 10-0867005 B1 | 11/2008 |
| KR | 10-1074850 B1 | 10/2011 |
| KR | 10-2012-0054236 A | 5/2012 |
| KR | 10-2014-0141025 A | 12/2014 |
| KR | 10-2016-0116842 A | 10/2016 |

OTHER PUBLICATIONS

Written Opinion dated Aug. 21, 2017, issued by the International Searching Authority in International Application No. PCT/KR2016/015051 (PCT/ISA/237).

* cited by examiner

| OBJECT ID | FEATURE CODE | FEATURE VALUE |
|---|---|---|
| 1 | COLOR OF TOP | Red |
| 1 | HEIGHT | 170 |
| 1 | COLOR OF HAIR | Black |
| 2 | GLASSES | Y |
| 2 | COLOR OF SHOES | Yellow |
| ⋮ | ⋮ | ⋮ |

FIG. 6

| DATE | TIME | CHANNEL | TYPE OF OBJECT | COLOR OF TOP | HEIGHT | COLOR OF HAIR | GLASSES | COLOR OF SHOES | LICENSE PLATE NUMBER | COLOR OF BOTTOM | COLOR OF VEHICLE |
|---|---|---|---|---|---|---|---|---|---|---|---|
| 2016/11/16 | 3:30:05 | 1 | PERSON | Red | 170 | Black | N | White | - | Blue | - |
| 2016/11/16 | 3:33:20 | 2 | PERSON | Black | 165 | Black | Y | Yellow | - | White | - |
| 2016/11/16 | 3:45:25 | 2 | VEHICLE | - | - | - | - | - | 3864 | - | White |
| 2016/11/16 | 3:57:49 | 4 | PERSON | Gray | 160 | Brown | N | White | - | White | - |
| 2016/11/16 | 4:00:03 | 3 | PERSON | Black | 165 | Black | Y | Yellow | - | White | - |
| 2016/11/16 | 4:01:05 | 4 | PERSON | Red | 170 | Black | N | White | - | Blue | - |

| CHANNEL | DATE | TIME | OBJECT ID |
|---|---|---|---|
| 1 | 2016/11/16 | 3:30:05 | 1 |
| 2 | 2016/11/16 | 3:33:20 | 2 |
| 3 | 2016/11/16 | 4:00:03 | 2 |
| 4 | 2016/11/16 | 4:01:05 | 1 |

VIDEO SEARCH DEVICE, DATA STORAGE METHOD AND DATA STORAGE DEVICE

CROSS-REFERENCE TO THE RELATED APPLICATION

This application is a Continuation of International Patent Application No. PCT/KR2016/015051, filed on Dec. 21, 2016, and claims priority from Korean Patent Application No. 10-2016-0156614, filed on Nov. 23, 2016, which is hereby incorporated by reference in its entirety.

BACKGROUND

Information disclosed in this Background section has already been known to the inventors before achieving the disclosure of the present application or is technical information acquired in the process of achieving the disclosure. Therefore, it may contain information that does not form the prior art that is already known to the public.

Methods and apparatuses consistent with exemplary embodiments relate to a video search device, a data storage method, and a data storage device. More specifically, the exemplary embodiments relate to a video search device that allows a user to easily search for desired video device by entering a feature of a specific object and/or a channel number as a search criterion as well as a specific time information. In addition, the exemplary embodiments relate to a data storage method and data storage device that can establish a minimum database so as to quickly search multiple channels.

Surveillance systems are widely used in various places including banks, department stores, and residential areas. Generally, surveillance systems are used mainly for crime prevention and security purposes. Recently, surveillance systems are also used indoors for monitoring pets or children in real-time. The closed circuit television (CCTV) system is one of the most commonly used surveillance systems, in which cameras are installed appropriate locations for capturing and monitoring desired areas so that a user can monitor the areas by watching videos captured by the cameras.

In particular, a number of cameras for such CCTV systems are installed at various locations in important buildings. In addition, a video wall system is provided so that security personnel can easily monitor the videos.

In a video wall system, a plurality of monitors may be arranged on a plane so that a plurality of monitors may display a plurality of videos, respectively. Alternatively, a plurality of monitors may operate as a single monitor having a large screen so that only one video can be displayed. Therefore, the video wall system is installed in a security room and allows security personnel to monitor the security system of an entire building at a glance through a plurality of monitors and to cope with a situation immediately.

In general, when a user wants to search a plurality of videos captured by a plurality of cameras for a particular video, she/he has to enter time as the search criterion. This is because the header file of each video contains only the time at which the video was captured.

In order to overcome such a shortcoming, a technique has been introduced that a video is analyzed immediately after a camera acquires it, and features of objects are extracted and stored together with the video. This technique may work well when there is only one camera (i.e., a single-channel video). However, if the technique is performed for each of the multi-channel video, the amount of data to be stored will increase as the number of objects increases, which requires a large database and causes the search to become very slow.

SUMMARY

The exemplary embodiments provide a video search device that allows a user to search for desired video in an easier and faster way by using diverse attributes of videos such as an object feature and/or a channel number as search criterion as well as time information.

In addition, the exemplary embodiments also provide a data storage method and data storage device for establishing a minimum database which enables an easier and faster search of multi-channel videos.

It should be noted that objects of the exemplary embodiments are not limited to achieving the above-mentioned object; and unmentioned objects may be achieved by those skilled in the art from the following descriptions.

According to an aspect of an exemplary embodiment, there is provided a video search device including: at least one processor configured to implement an updating unit generating event object information based on feature information on an object detected in a video; and a storage configured to store comparison object information containing feature information on a reference object, wherein the processor is further configured to implement: an object information generating/deleting unit configured to create information on an object having a predetermined degree of similarity between the event object information and the comparison object information as final object information, and storing the final object information in the storage; and a data searching unit searching the final object information for data that satisfies a search criterion entered by a user.

The number of attribute items included in the final object information may be smaller than a number of attribute items included in the event object information.

The object information generating/deleting unit is further configured to store information on an object having a similarity lower than the predetermined degree in the storage as temporary object information.

The at least one processor may be configured to implement a counting unit configured to determine whether the temporary object information satisfies a predetermined criterion.

If it is determined that the temporary object information satisfies the predetermined criterion, the updating unit may update the final object information based on the temporary object information.

If it is determined that the temporary object information satisfies the predetermined criterion, the updating unit may update the comparison object information based on the temporary object information.

If the temporary object information fails to satisfy the predetermined criterion for a predetermined time, the object information generating/deleting unit may delete the temporary object information.

The storage may store a representative image for the video.

The device may further include: a display configured to display a video derived as search results when the data searching unit searches for the data, wherein the display displays the representative image associated with the video as thumbnails.

According to another aspect of an exemplary embodiment, there is provided a data storage method including: generating event object information including a plurality of entries each of which includes a plurality of attribute items of an object detected in a video; comparing the event object information with comparison object information including feature information on a reference object; selecting at least one entry, from among a plurality of entries, of which attribute items have at least a predetermined degree of similarity to the feature information on the reference object; generating final object information in which at least one attribute item from among the attribute items of the at least one entry is associated with an identifier of the reference object; and establishing a database based on the final object information such that the at least one entry can be retrieved from the database by the at least one attribute item or the identifier of the reference object.

The number of the at least one attribute item included in the final object information may be smaller than a number of the attribute items included in the event object information.

The method may further include: generating temporary object information based on another entry, from among the plurality of entries, of which attribute items have a less similarity to the feature information on the reference object than the predetermined degree.

The method may further include: updating the final object information to include at least one attribute item of the other entry, if it is determined that the temporary object information satisfies a predetermined criterion.

The method may further include: searching the final object information for data if a search criterion is entered.

According to another aspect of an exemplary embodiment, there is provided a data storage device including: at least one processor to implement an updating unit extracting feature information on objects included in videos, and generating event object information based on the extracted feature information; and a storage configured to store the event object information, wherein the processor is further configured to implement: a comparing unit configured to compare the extracted feature information with event object information already stored in the storage; and an object information generating/deleting unit configured to create final object information based on information on an object having a similarity between the extracted feature information and the event object information, and store the final object information in the storage.

The number of attribute items included in the final object information may be smaller than a number of attribute items included in the event object information.

The at least one processor may be configured to implement: a data searching unit configured to search the final object information for data that satisfies a search criterion entered by a user.

BRIEF DESCRIPTION OF THE DRAWINGS

The above and other aspects and features of the present disclosure will become more apparent by describing in detail exemplary embodiments thereof with reference to the attached drawings, in which:

FIG. 6 is a table showing an example of the event object information 122 according to an exemplary embodiment.

DETAILED DESCRIPTION OF THE EXEMPLARY EMBODIMENTS

Figure 1:
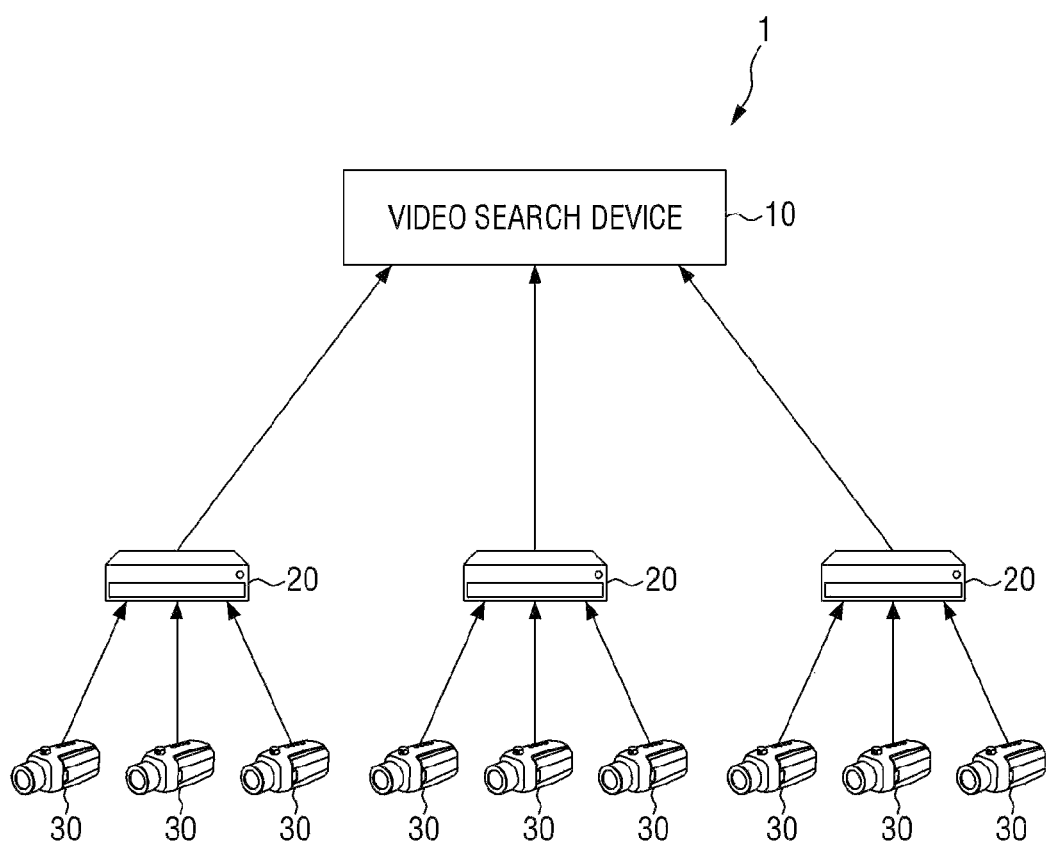
FIG. 1 is a diagram showing a configuration of a video search system 1 according to an exemplary embodiment.

Advantages and features of the present disclosure and methods to achieve them will become apparent from the exemplary embodiments described below with reference to the accompanying drawings. However, the present invention is not limited to exemplary embodiments disclosed herein but may be implemented in various different ways. The exemplary embodiments are provided for making the disclosure of the inventive concept to those skilled in the art. It is to be noted that the scope of the present invention is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is a diagram showing a configuration of a video search system 1 according to an exemplary embodiment.

By utilizing the video search system 1 according to an exemplary embodiment, videos acquired from a plurality of channels can be quickly and easily searched for using a specific object or a specific channel as a search criterion. A database (DB) should be established in advance so that a user can easily search the videos by using the video search system 1. To this end, the system may include a video search device 10, at least one video management device 20 connected to the video search device 10, and at least one camera 30 connected to the video management device 20, as shown in FIG. 1.

The camera 30 acquires a video by capturing a certain area and receiving an image signal for the area. To this end, the camera 30 may include image pickup devices such as a Charge Coupled Device (CCD) and a complementary metal-oxide semiconductor (CMOS) image sensor. Although the camera 30 are preferably pan/tilt camera 30 capable of panning and tilting, the present disclosure is not limited thereto. A variety of cameras can be employed as the camera 30.

The video management device 20 receive multimedia objects such as images and sounds, in addition to videos, which are obtained over a network from the camera 30, and store and display them. The video management device 20 may be Network Video Recorder (NVR) or Digital Video Recorder (DVR) which are implemented separately from the camera 30 and store videos, as shown in FIG. 1. Alternatively, the video management device 20 may integrally manage and control videos and may monitor videos remotely. Examples of the video management device 20 may include, but are not limited to, a Central Management System (CMS), a Video Management System (VMS), a personal computer, and a portable terminal. Any device may be used as the video management device 20 as long as it can receive multimedia objects from one or more terminals over a network and display and/or store them.

The video management device 20 may be a single-channel video management device 20 that can be connected to only one camera 30, or a multi-channel video management device 20 that can be connected to multiple cameras 30. It is, however, to be understood that the video management device 20 is not limited thereto. The video management device 20 may be incorporated in each camera 30, and in such case, the video search device 10 may be directly connected to the camera 30.

The video management device 20 may perform video analysis (VA). The video analysis may refer to separating an object from a background on a video and automatically extracting features of the object. To separate an object from a background, a window search technique may be used, for example. When the features of an object are extracted, the features may be extracted as binary coded features such as Local Binary Patterns (LBP) and Modified Census Transform (MCT). Alternatively, the features may be extracted as histogram features that are used to calculate a histogram later, such as Speeded-Up Robust Features (SURF), a Scale Invariant Feature Transform (SIFT) and a Histogram of Oriented Gradient (HOG). The video management device 20 may perform face recognition as well. A window search technique may be used to detect a face region of a person. Various classifiers stored in the window may be used, such as Adaboost, Random Forest, Support Vector Machine (SVM) and Neural Network (NN).

Once the video management device 20 performs the video analysis to separate an object from the background and extracts the features of the object, the video analysis results are converted into metadata, and the metadata is transmitted to the video search device 10.

The video analysis may be performed by the camera 30, instead of the video management device 20. In such case, the camera 30 may transmit video streaming data to the video management device 20, with the video analysis result data included in the video header file. Once the video management device 20 receives a video, it converts the video analysis result data included in the video header file into metadata, and transmits the metadata to the video search device 10.

Although not shown in the drawings, a separate VA engine may be provided in the video search system 1 so as to perform the video analysis (VA). In such case, the VA engine receives the video streaming data from the video management device 20 or the camera 30, and performs the video analysis. Then, the VA engine may convert the video analysis result data into metadata and transmit it to the video search device 10.

If the video management device 20 is incorporated in the camera 30, the camera 30 may convert the video analysis result data into metadata and transmit the metadata to the video search device 10.

Although the video search device 10 and the video management device 20 have been described as separate devices in the foregoing description, the video search device 10 may be included in one of the video management device 20. In such case, the video management device 20 including the video search device 10 works as the main video management device 20, and the rest of the video management devices 20 work as subsidiary video management devices. Each of the subsidiary video management devices 20 may transmit the metadata to the main video management device 20.

That is to say, the configuration of the video search system 1 can be variously changed as long as the video search device 10 can receive the video analysis results as metadata.

Figure 2:
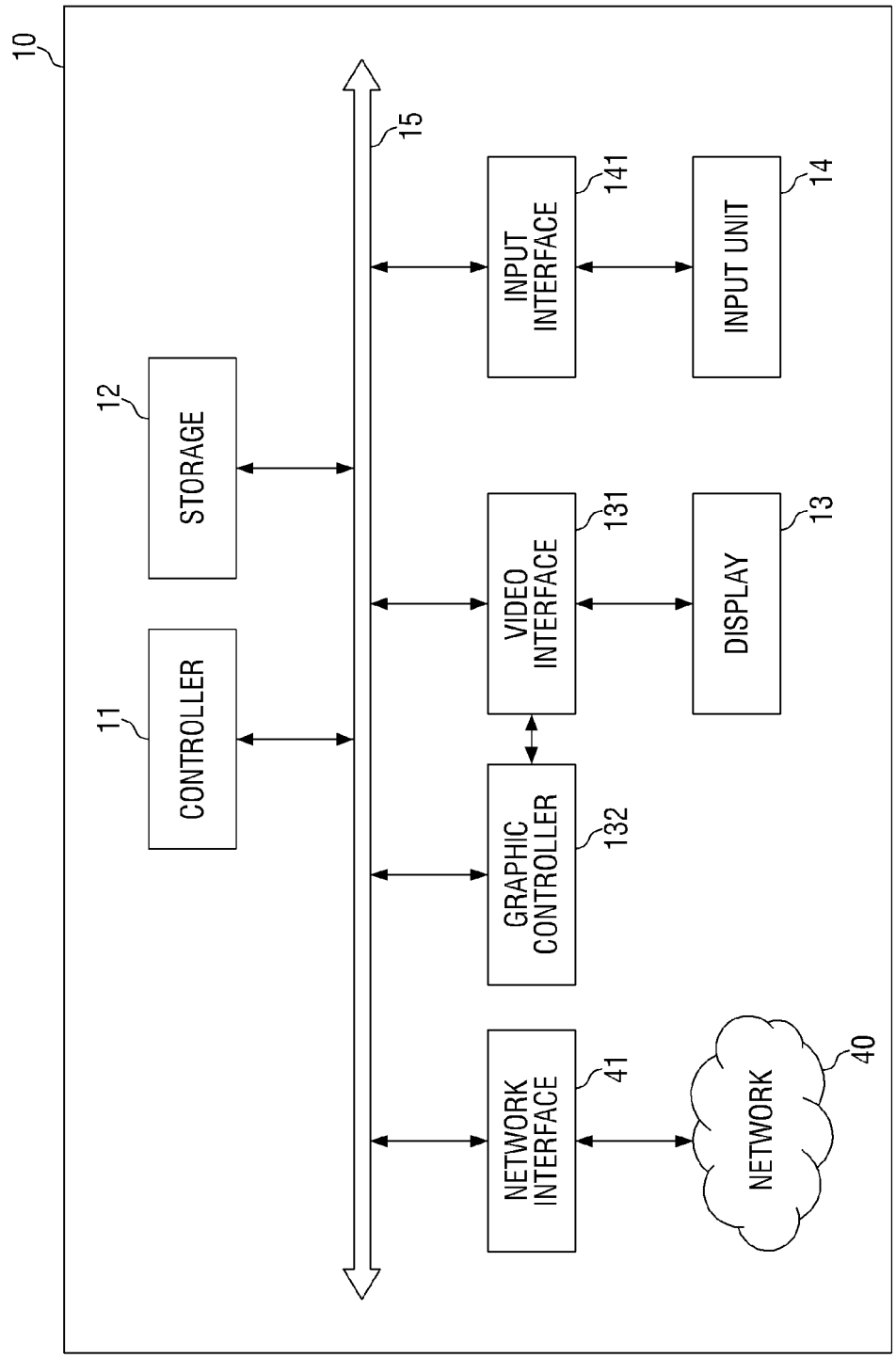
FIG. 2 is a block diagram of a video search device 10 according to an exemplary embodiment.

FIG. 2 is a block diagram of the video search device 10 according to an exemplary embodiment.

The video search device 10 analyzes metadata received from the camera 30 or the video management device 20, and extracts feature information on an object included in the video (i.e., an object detected in the video). Then, the video search device 10 establishes a database, which a user can search using feature information on objects. To this end, the video search device 10 may include a controller 11, a storage 12, an input 14, and a display 13. These elements may be connected to a bus 15 to communicate with each another. The elements included in the controller 11 may be connected to the bus 15 via at least one interface or adapter, or may be connected directly to the bus 15. In addition, the bus 15 may be connected to other sub-systems other than those described above. The bus 15 may include a memory bus, a memory controller, a peripheral bus, and a local bus.

The controller 11 controls the overall operation of the video search device 10. For example, when the metadata is received from the video management device 20, the camera 30, or a separate VA engine, the controller 11 extracts the feature information on the object included in the video from the metadata and writes it in the storage 12 as event object information 122. The event object information 122 is compared with the comparison object information 121 that is previously stored. The comparison object information 121 may represent features of a reference object (i.e., an object of user's interest). The comparison object information 121 will be described later in more detail with reference to FIG. 5.

Depending on the comparison results, either the final object information 123 or the temporary object information 124 is generated. When a database including the final object information 123 and temporary object information 124 is established, a video search is performed using the database. To implement the controller 11, at least one processor, such as a central processing unit (CPU), a microcontroller unit (MCU), and/or a digital signal processor (DSP) may be employed. It is, however, to be understood that the present disclosure is not limited thereto, but a variety of logic operation processors may be employed as well. The controller 11 will be described later in detail.

The storage 12 stores various kinds of object information, and a database is established by the controller 11. The storage 12 may include a non-volatile memory device and a volatile memory device. The non-volatile memory device may be, but is not limited to, a NAND flash memory that is small in volume, light and resistant to external impact. The volatile memory device may be, but is not limited to, a DDR SDRAM. The storage 12 will be described later in more detail.

The video search device 10 may be connected to the network 40. Accordingly, the video search device 10 may be connected to other devices over the network 40, and may transmit and receive various data and signals including metadata. The network interface 41 may receive data in the form of one or more packets from the network 40. The video search device 10 may store the received data in the storage 12, which is processed by the controller 11. Likewise, the video search device 10 may store transmission data in the form of one or more packets in the storage 12, and the network interface 41 may send the transmission data to the network 40.

The network interface 41 may include a network interface card, a modem, and the like. The network 40 may include a variety of wired/wireless communications channels such as the Internet, a wide area network (WAN), a local area network (LAN), a telephone network, direction connection communications, etc.

The display 13 may display search results performed pursuant to the search criterion entered by a user so that the user can see the search results. Even if the video search device 10 does not have a touch input recognition capability, a user's input may be received through the input interface 141. User's input may be generated by an input unit 14 that is connected to the input interface 141. Examples of the input device may include, but are not limited to, a mouse, a keyboard, a joystick and a remote controller. Examples of the input interface 141 may include, but are not limited to, a serial port, a parallel port, a game port, a USB, etc. The display 13 may include a touch sensor so that the video search device 10 is capable of receiving a touch input. In this case, the input unit 14 may not be provided, and the user can input the touch signal directly through the display 13. The touch input may be made using a finger. It is, however, to be understood that the present disclosure is not limited thereto. A touch may be made by using a proper tool, such as a stylus pen with a tip through which a minute current can flow. Even if the video search device 10 provides the touch capability, a separate touch pad may be provided as an input unit 14 if the display 13 does not include the touch sensor.

Examples of the display 13 may include, but are not limited to, a liquid-crystal display (LCD), an organic light-emitting display (OLED), a cathode ray tube (CRT), a plasma display panel (PDP), etc. The display 13 may be connected to the bus 15 through the video interface 131, and the data transfer between the display 13 and the bus 15 may be controlled by the graphic controller 132.

Figure 3:
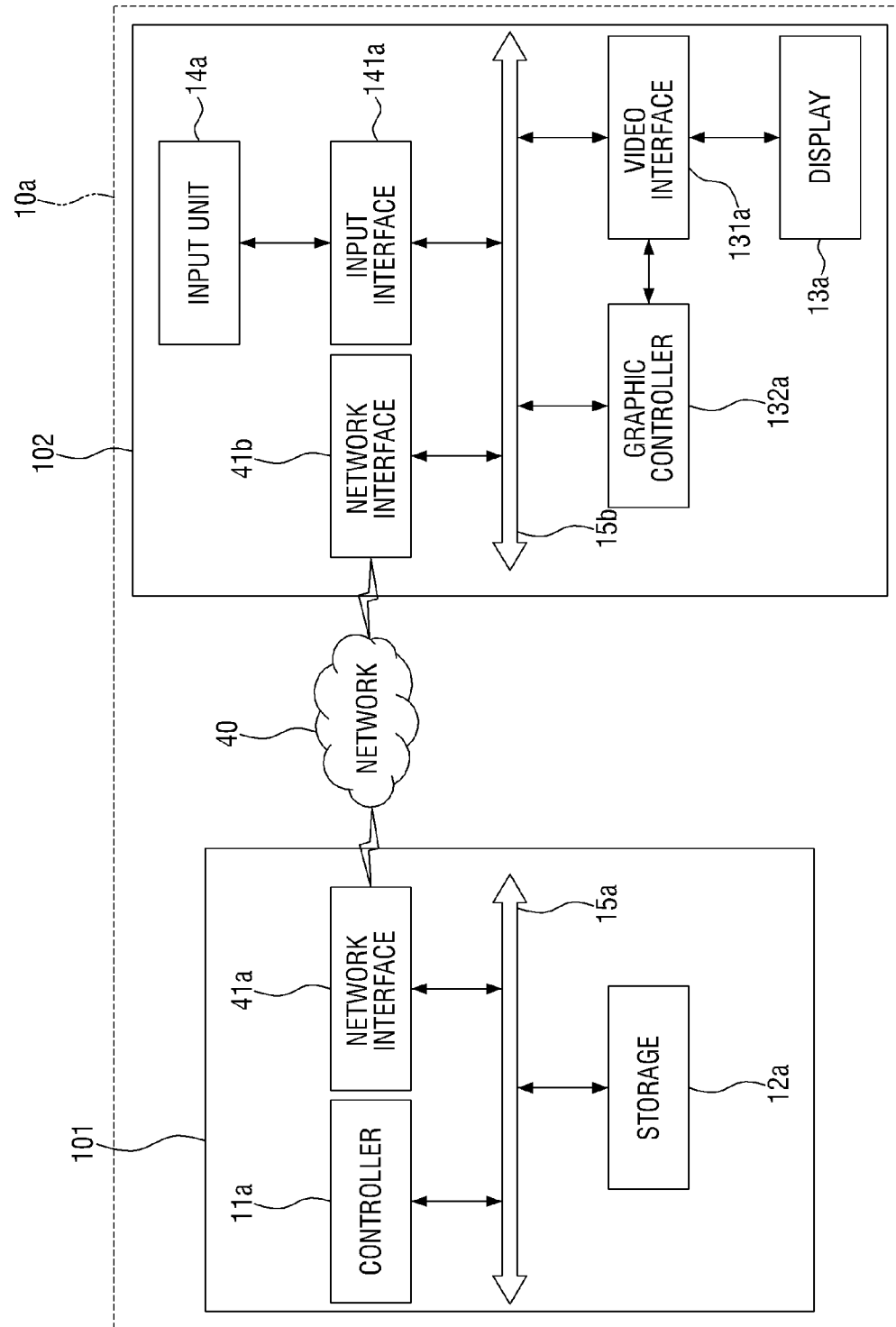
FIG. 3 is a block diagram of a video search device 10*a* according to another exemplary embodiment.

FIG. 3 is a block diagram of a video search device 10a according to another exemplary embodiment.

The video search device 10a may be implemented using a single module or a combination of various other devices. The video search device 10a may include a data storage device 101 and a console 102. The data storage device 101 may establish a database. The console 102 may receive a search criterion of video data from a user, display search results to the user, and receive video streaming data, and display a video using the video streaming data.

The data storage device 101 may include a controller 11a and a storage 12a. The console 102 may include an input unit 14 and a display 13. These elements may communicate each another via buses 15a and 15b. More than one console 102 may be provided for multiple users.

Some of the elements included in the video search device 10a that are similar to those described above with reference to FIG. 2 will not be described in detail. It is to be understood that the elements may be modified slightly in accordance with various exemplary embodiments. Such modifications could easily be practiced by one skilled in the art after reading the specification and the accompanying drawings.

Figures 4, 5:
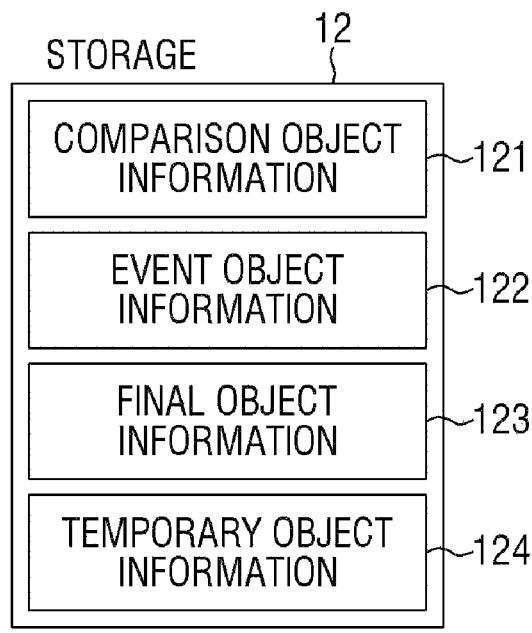
FIG. 4 is a block diagram of the storage 12 according to an exemplary embodiment.
FIG. 5 is a table showing an example of the comparison object information 121 according to an exemplary embodiment.

FIG. 4 is a block diagram of the storage 12 according to an exemplary embodiment of the present disclosure. FIG. 5 is a table showing an example of the comparison object information 121 according to an exemplary embodiment.

The storage 12 stores comparison object information 121, event object information 122, final object information 123, and temporary object information 124, as shown in FIG. 4.

The comparison object information 121 may include feature information on an object that a user wants to search for. The comparison object information 121 may be compared with the event object information 122 for the search. The comparison object information 121 may be directly entered by the user, but may be received from another device or downloaded from a server.

The comparison object information 121 may have attribute items such as an object ID (i.e., identifier), a feature code, a feature value, etc. of at least one reference object. The user may enter object information in accordance with these attribute items. For example, as shown in FIG. 5, a user may assign object ID 1 to a reference object who wears a red top (Red), is approximately 170 cm tall, and has black hair (Black) to one. In addition, the user may assign object ID 2 to a reference object who wears glasses and yellow shoes to two.

FIG. 6 is a table showing an example of the event object information 122 according to an exemplary embodiment.

The event object information 122 is the feature information on an object extracted from a video captured by the camera 30. Each of the camera 30 captures video by recording a predetermined area in real-time. Whenever an object appears unexpectedly, the video management device 20, the camera 30, or a separate VA engine extracts the features of the object from the video by video analysis. Then, the video analysis result data containing the feature information on the object is converted into metadata, and the metadata is transmitted to the video search device 10. The controller 11 extracts the features of the object from the received metadata, updates the event object information 122 based on the extracted feature information in real-time, and writes the updated event object information 122 in the storage 12. The controller 11 later compares the event object information 122 with the comparison object information 121 to determine the similarity.

As shown in FIG. 6, the event object information 122 may contain one or more entries, and each entry may include various attribute items representing features of a particular object.

For example, the first entry shows that an object captured by a camera 30 of Channel 1 at 3:30:05 on Nov. 16, 2016 is a person who wears a red top (Red), is approximately 170 cm tall, has black hair (Black), does not wear glasses (N), wears white shoes (White), and wears a blue bottom (Blue).

The second entry shows that an object captured by a camera 30 of Channel 2 at 3:33:20 is a person who wears a black top (Black), is approximately 165 cm tall, has black hair (Black), wears glasses (Y), wears yellow shoes (Yellow), and wears a white bottom (White).

The third entry shows that an object captured by a camera 30 of Channel 2 at 3:45:25 is a white vehicle having the license plate number of 3864.

The fourth entry shows that an object captured by a camera 30 of Channel 4 at 3:57:49 is a person who wears a gray top (Gray), is approximately 160 cm tall, has brown hair (Brown), does not wear glasses (N), wears white shoes (White), and wears a white bottom (White).

The fifth entry shows that an object captured by a camera 30 of Channel 3 at 4:00:03 is a person who wears a black top (Black), is approximately 165 cm tall, has black hair (Black), wears glasses (Y), wears yellow shoes (Yellow), and wears a white bottom (White).

The sixth entry shows that an object captured by a camera 30 of Channel 4 at 4:01:5 is a person who wears a red top (Red), is approximately 170 cm tall, has black hair (Black), does not wear glasses (N), wears white shoes (White), and wears a blue bottom (Blue).

The event object information 122 may be generated or updated based on the feature information on the object extracted from the metadata. The metadata may be generated in real-time through video analysis by the video management device 20, the camera 30, or a separate VA engine whenever an object appears. The data amount of the event object information 122 keeps increasing over time. As a result, there is a problem that the database established in the storage 12 becomes too large. Accordingly, it is desirable that the event object information 122 is automatically deleted if it becomes larger than a predetermined data size or when a predetermined period of time has elapsed.

Figures 7, 8:
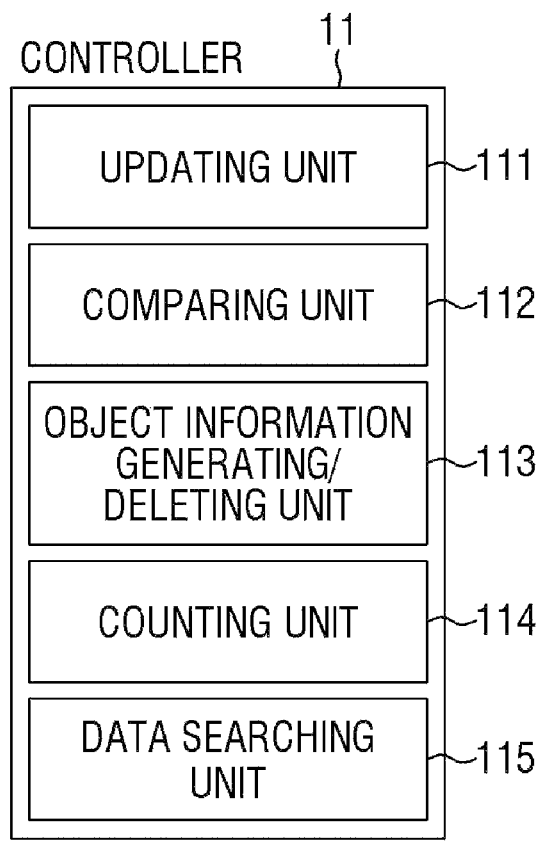
FIG. 7 is a table showing an example of the final object information 123 according to an exemplary embodiment.
FIG. 8 is a block diagram of the controller 11 according to an exemplary embodiment.

FIG. 7 is a table showing an example of the final object information 123 according to an exemplary embodiment.

The final object information 123 may refer to feature information on an object having a high degree of similarity between the event object information 122 and the comparison object information 121. A high degree of similarity means that there are many attribute items that match between the event object information 122 and the comparison object information 121. On the contrary, a low degree of similarity means that there are a few attribute items that match between the event object information 122 and the comparison object information 121. Although a different criterion may be used, the degree of similarity may be determined to be high if more than 80% attribute items match between them.

Specifically, a comparing unit 112 may determine the similarity between the event object information 122 and the comparison object information 121. That is to say, the comparing unit 112 does not determine the similarity among the plurality of objects included in the event object information 122

The controller 11 compares the event object information 122 with the comparison object information 121 that was previously stored. The controller 11 selects the object having a high degree of similarity between the event object information 122 and the comparison object information 121, creates the final object information 123 based the attribute items of the object, and stores the final object information 123 in the storage 12. A user is likely to be interested in the object with a high degree of similarity.

Assume that the event object information 122 shown in FIG. 6 is compared with the comparison object information 121 shown in FIG. 5. As shown in FIG. 5, the user has set the object ID of the object who wears a red top (Red), is approximately 170 cm tall and has black hair to one in the comparison object information 121. In this regard, in the event object information 122, both of the object captured by the camera 30 of Channel 1 at 3:30:5 and the object captured by the camera 30 of Channel 4 at 4:1:5 on Nov. 16, 2016 wear a red top (Red), are approximately 170 cm tall and have black hair (Black). Accordingly, the identical object ID of 1 is assigned to both objects. The user did not enter the attribute items regarding glasses, color of shoes, etc. for the object having the object ID of 1 in the comparison object information 121. Therefore, the attribute items regarding glasses, color of shoes, etc. are not considered when the comparing unit 112 compares the event object information 122 with the comparison object information 121 to perform search based on the attribute items associated with object ID 1. Accordingly, even if one of the object captured by the camera 30 of Channel 1 at 3:30:5 and the object captured by the camera 30 of Channel 4 at 4:1:5 wears glasses and the other does not, or even if they wear different colors of shoes, the two objects are determined to be identical, so that the identical object ID of 1 is assigned to both of them.

In addition, the user has set the object ID of the object who wears glasses and wears yellow shoes (Yellow) to two in the comparison object information 121. On the other hand, in the event object information 122, both of the object captured by the camera 30 of Channel 2 at 3:33:20 and the object captured by the camera 30 of Channel 3 at 4:00:03 on Nov. 16, 2016 wear glasses and yellow shoes (Yellow). Accordingly, the identical object ID of 2 is assigned to both objects. Likewise, the user did not enter the attribute items regarding the color of the top, the height, etc. for the object having the object ID of 2 in the comparison object information 121. Therefore, the attribute items regarding the color of the top, the height, etc. are not considered when the comparing unit 112 compares the event object information 122 to the comparison object information 121 to perform search based on the attribute items associated with object ID 2. Accordingly, even if the object captured by the camera 33 of Channel 2 at 3:30:20 and the object captured by the camera 30 of Channel 3 at 4:00:03 wear different colors of the top or have different heights, the two objects are determined to be identical, so the identical object ID of 2 is assigned to both of them.

When there is an object having a high degree of similarity between the event object information 122 and the object information 121, the controller 11 writes the feature information on the object as the final object information 123 in the storage 12. As shown in FIG. 7, the final object information 123 may contain attribute items of channel, date, time, and object ID of the objects that are assigned the object IDs of 1 and 2 in the above example. It is to be noted that the final object information 123 does not include attribute items such as the color of the top, the height, etc. because the final object information 123 does not need to include all attribute items of the event object information 122. It is desirable that the number of attribute items included in the final object information 123 is smaller than the number of attribute items included in the event object information 122 in order to further reduce the size of the database established in the storage. For example, as shown in FIG. 7, the final object information 123 only contains attribute items of channel, date, time, and object ID.

On the contrary, the temporary object information 124 may refer to feature information on an object having a low degree of similarity between the event object information 122 and the comparison object information 121. Since it is not likely that the object having a low degree of similarity is of user's interest, information about such an object may be deleted without being stored in the storage 12 as the final object information 123.

However, even if an object does not satisfy the attribute items the user entered in the comparison object information 121, she/he may be interested in the object in the future. For example, while a user monitors the video from the camera 30, she/he may pay attention to an object which appears too often or behaves strangely. When this happens, it is required that the user can perform search with respect to such an object. Therefore, even if an object has a low degree of similarity, the controller 11 may temporarily store information about the object in the storage 12 as the temporary object information 124. For example, in the event object information 122 of FIG. 6, the object captured by the camera 30 of Channel 2 at 3:45:25 and the object captured by the camera 30 of Channel 4 at 3:57:49 on Nov. 16, 2016 do not satisfy any of the attributes set in the comparison object information 121. In other words, with respect to the two objects, there is a low degree of similarity between the comparison object information 121 and the event object information 122. The controller 11 writes information about the objects into the storage 12 as the temporary object information 124.

Then, the controller 11 determines whether the temporary object information 124 satisfies a predetermined criterion. If the temporary object information 124 satisfies the criterion, the final object information 123 may be updated based on the temporary object information 124. By doing so, the user may be able to perform search with respect to a certain object even though the object has a low degree of similarity.

If the temporary object information 124 satisfies the criterion, the comparison object information 121 may also be updated based on the temporary object information 124. Accordingly, as the event object information 122 is updated, an object initially having a low degree of similarity may have a high degree of similarity later, and may be directly stored in the storage 12 as the final object information 123.

If the temporary object information 124 does not satisfy the criterion, it is not likely that the user will be interested in such an object even in the future. Therefore, it is desirable that the temporary object information 124 about the object is automatically deleted after a predetermined time in order to free up the storage space.

Herein, the predetermined criterion refers to a condition that causes a user to be interested in a particular object that the user was not interested in previously. For example, as described above, if an object appears too frequently or behaves strangely, the user may be interested in the object while monitoring the video from the camera 30. Accordingly, the predetermined criterion may include the frequency at which an object appears, or the frequency at which an object takes a suspicious action. Suspicious actions may include, for example, an unnatural gait pattern, overly turning one's head or eyes to look around, keeping chasing another object while maintaining a constant distance, and so on. Such suspicious actions or the predetermined criterion may be detected through video analysis by the video management device 20, the camera 30, or a separate VA engine.

FIG. 8 is a block diagram of the controller 11 according to an exemplary embodiment.

The controller 11 compares the event object information 122 with the comparison object information 121 that was previously stored, generates the final object information 123 or the temporary object information 124 depending on the comparison result, and establish a database based on the final object information 123 and the temporary object information 124. When a user enters a search criterion for searching for a video, the database is searched to find a video satisfying the search criterion. To this end, the controller 11 may include an updating unit 111, an object information generating/deleting unit 113, a comparing unit 112, a counting unit 114, and a data searching unit 115.

The updating unit 111 updates various kinds of object information and stores object information in the storage 12. Specifically, the updating unit 111 updates the feature information on an object that is extracted from the metadata as the event object information 122 and writes the updated feature information in the storage 12. Then, the updating unit 111 updates the object having a high degree of similarity between the comparison object information 121 and the event object information 122 as the final object information 123, and store information about the object in the storage 12. In addition, if the temporary object information 124 satisfies a predetermined criterion, the final object information 123 and the comparison object information 121 are updated based on the temporary object information 124, and stored in the storage 12.

The comparing unit 112 compares the updated event object information 122 with the comparison object information 121 that was previously stored. The final object information 123 or the temporary object information 124 may be generated by the object information generating/deleting unit 113 depending on the similarity. Specifically, when an object has a high degree of similarity between the event object information 122 and the comparison object information 121, the comparing unit 112 may cause the object information generating/deleting unit 113 to generate the final object information 123. On the other hand, if the object has a low degree of similarity, the comparing unit 112 may cause the object information generating/deleting unit 113 to generate the temporary object information 124.

The object information generating/deleting unit 113 generates the final object information 123 or the temporary object information 124 depending on the results of comparison between the event object information 122 and the comparison object information 121 by the comparing unit 112. Also, the object information generating/deleting unit 113 may delete the temporary object information 124 about a particular object (e.g., relevant entry in a table) if the temporary object information 124 does not satisfy the predetermined criterion for a predetermined time. A database may be established using the final object information 123 and temporary object information 124, and the data searching unit 115 may use the database to perform video search.

The counting unit 114 determines whether the temporary object information 124 satisfies the predetermined criterion. For example, as described above, the predetermined criterion may include the frequency at which an object appears, or the frequency at which an object takes a suspicious action. Accordingly, the counting unit 114 may count the frequency at which an object appears or the frequency at which an object takes a suspicious action. If the temporary object information 124 satisfies the predetermined criterion, the updating unit 111 may update the final object information 123 and the comparison object information 121 based on the temporary object information 124. On the other hand, if the temporary object information 124 about a particular object does not satisfy the predetermined criterion, the object information generating/deleting unit 113 may delete the temporary object information 124 (e.g., a pertinent entry in a table) when a predetermined time has elapsed after the temporary object information 124 was generated.

When the user enters a search criterion to search for a video, the data searching unit 115 may search only the final object information 123 stored in the storage 12 to derive search results. During the process of establishing the database, as described above, the final object information 123 may only include information on an object that the user was initially interested in and the information on an object in which the user is expected to be interested in the future. In other words, the information on the object that the user is not expected to be interested is not included in the final object information 123. As such, only a minimum size of database can be established in the storage 12, and thus the data searching unit 115 can quickly search the multi-channel videos.

Each of the elements of the video search device 10 described above may be implemented as software such as a task, a class, a subroutine, a process, an object, an execution thread and a program executed in a predetermined area on a memory, or hardware such as a field-programmable gate array (FPGA) and an application-specific integrated circuit (ASIC), or a combination of the software and the hardware. The elements may be included in a computer-readable storage medium, or some of the elements may be distributed across a plurality of computers.

Also, the elements may be implemented using at least one processor such as a central processor (CPU), a microcontroller unit (MCU), a digital signal processor (DSP), etc. Such a processor may execute computer executable instructions stored in at least one memory to perform their functions described in this disclosure.

In addition, the blocks may represent portions of modules, segments or codes including one or more executable instructions for performing a specified logical function(s). In addition, in some alternative embodiments, the functions described in association with blocks may be performed out of the sequence. For example, two consecutive blocks may be performed substantially simultaneously or may be performed in the reverse order depending on the function to be performed.

Figure 9:
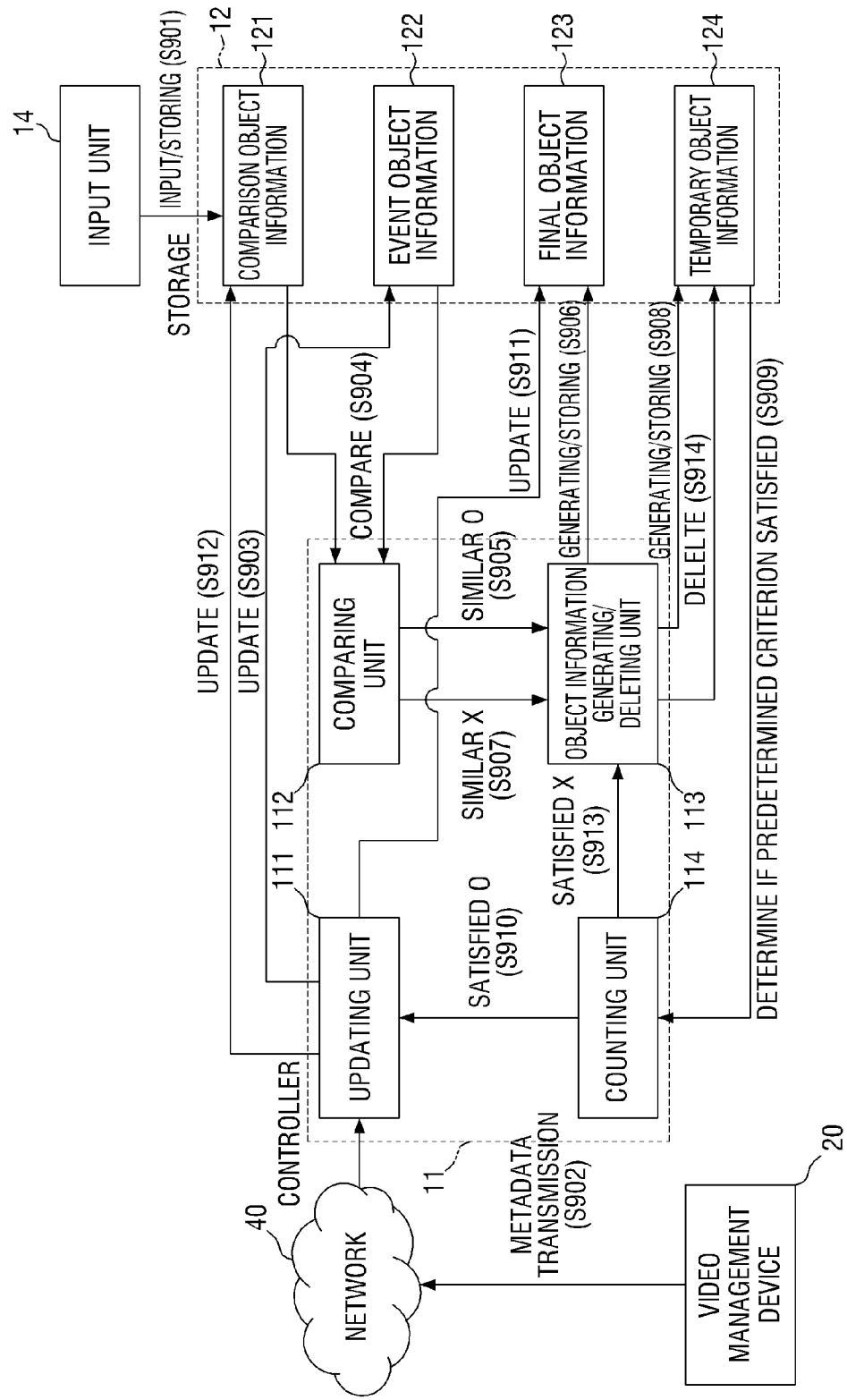
FIG. 9 is a diagram illustrating an operation flow of storing data by the video search system 1 according to an exemplary embodiment.
Figure 10:
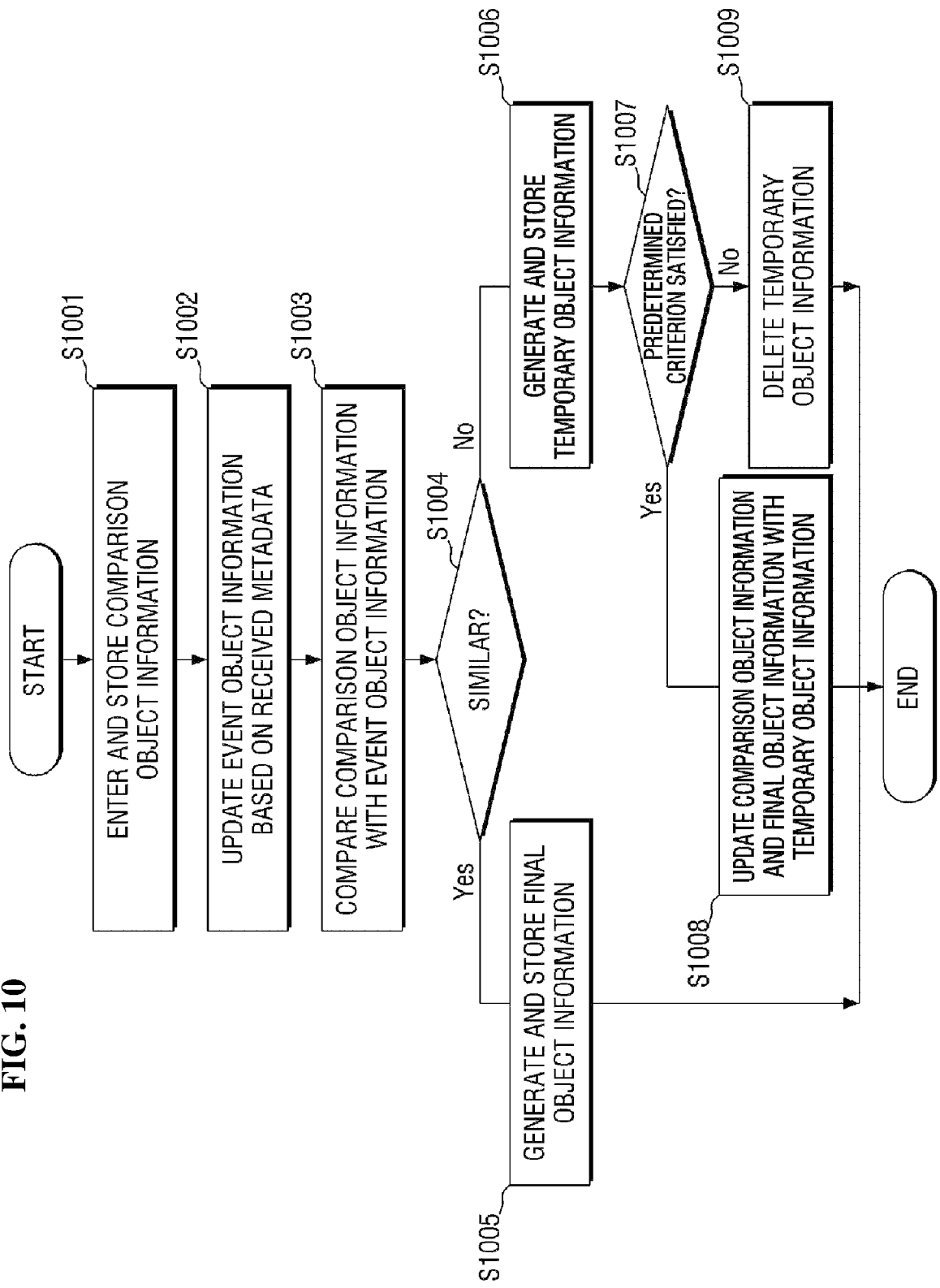
FIG. 10 is a flowchart illustrating a process of storing data by the video search system 1 according to an exemplary embodiment.

FIG. 9 is a diagram illustrating an operation flow of storing data by the video search system 1 according to an exemplary embodiment. FIG. 10 is a flowchart illustrating a process of storing data by the video search system 1 according to an exemplary embodiment.

As described above, in order to quickly and easily search the videos acquired from a plurality of channels using the video search system 1, a process of storing data to establish an efficient database should be performed. Hereinafter, a process of storing data by the video search system 1 according to an exemplary embodiment will be described with reference to FIGS. 9 and 10.

In order to store data in the video search system 1, the comparison object information 121 may be stored in the video search device 10 in advance. For example, the user may directly enter the comparison object information 121 through the input unit 14. The comparison object information 121 entered by the user is stored in the storage 12 (S901 and S1001).

The controller 11 of the video search device 10 receives metadata from the video management device 20, the camera 30, and/or a separate VA engine (S902). The camera 30 may generate video by capturing a predetermined area in real-time. Whenever an object appears unexpectedly, metadata containing information on the features of the object is transmitted to the video image search device 10. The updating unit 111 of the video search device 10 analyzes the metadata whenever it is received, to extract feature information on an object included in the video. Then, the updating unit 111 updates the event object information 122 based on the extracted feature information on the object in real-time, and writes it in the storage 12 (S903 and S1002).

The comparing unit 112 compares the updated event object information 122 with the comparison object information 121 that was previously stored (S904 and S1003). In addition, the object information generating/deleting unit 113 generates the final object information 123 that includes information about the object having a high degree of similarity between the event object information 122 and the comparison object information 121. Then, the object information generating/deleting unit 113 stores the final object information 123 in the storage 12 (S906 and S1005). On the contrary, for the object having a low degree of similarity (S907 and S1004), the object information generating/deleting unit 113 creates the temporary object information 124 that includes information about such objects, and stores the temporary object information 124 in the storage 12 (S908 and S1006).

The counting unit 114 determines whether the temporary object information 124 satisfies the predetermined criterion (S909 and S1007). If the temporary object information 124 satisfies the predetermined criterion (S910), the updating unit 111 updates the final object information 123 and the comparison object information 121 to include the temporary object information 124 (S911, S912 and S1008). On the other hand, if the temporary object information 124 does not satisfy the predetermined criterion for a predetermined time (S913), the object information generating/deleting unit 113 deletes the temporary object information 124 (S914 and S1009).

Figure 11:
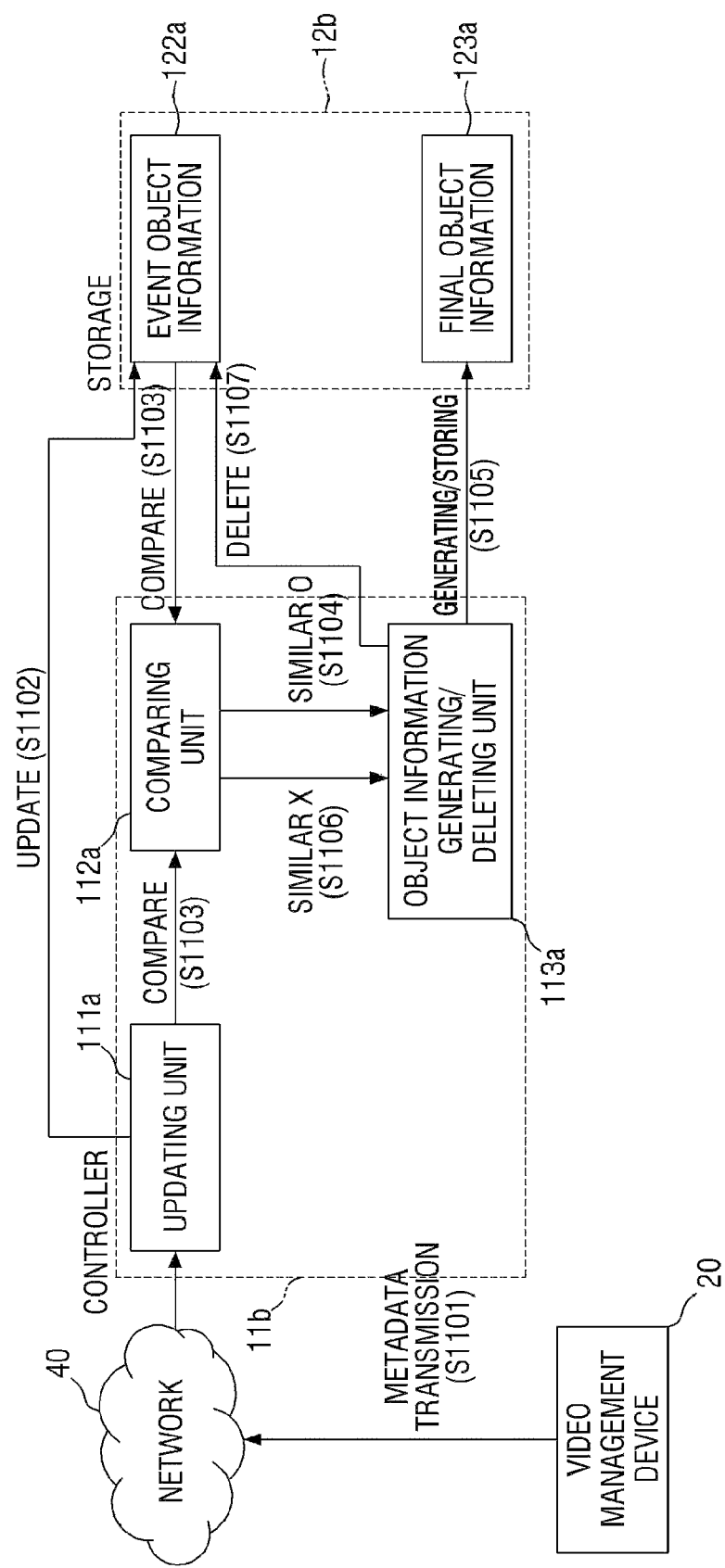
FIG. 11 is a diagram illustrating an operation flow of storing data by the video search system 1 according to yet another exemplary embodiment.
Figure 12:
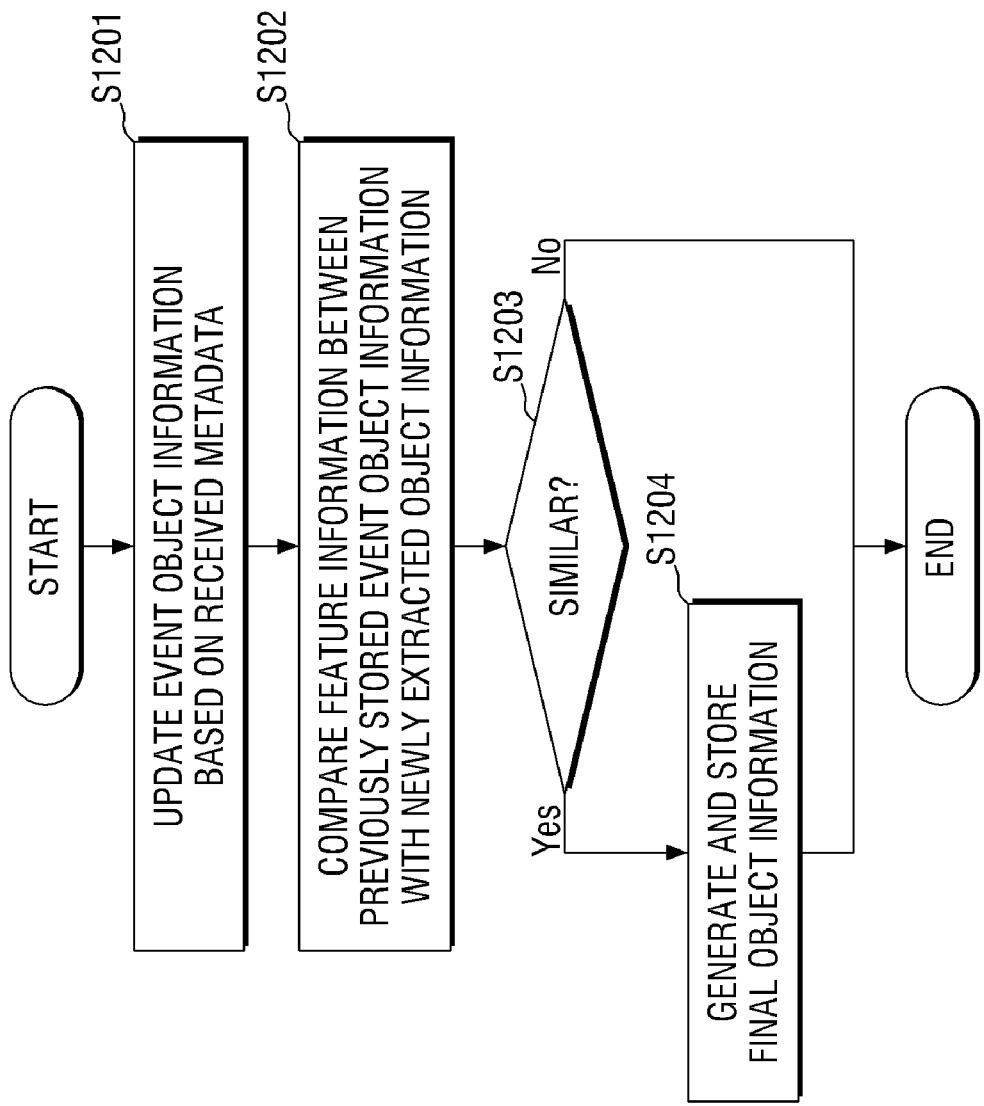
FIG. 12 is a flowchart illustrating a process of storing data by the video search system 1 according to yet another exemplary embodiment.

FIG. 11 is a diagram illustrating an operation flow of storing data by the video search system 1 according to another exemplary embodiment. FIG. 12 is a flowchart illustrating a process of storing data by the video search system 1 according to another exemplary embodiment.

According to another exemplary embodiment, the video search system 1 does not use the comparison object information 121. That is to say, the user does not need to enter the object information in advance, and it is not necessary to receive the object information from a server or an external device in advance.

In addition, the video search system 1 does not use the temporary object information 124, either. Therefore, there is no need for the counting unit 114 to determine whether the temporary object information 124 satisfies a predetermined criterion. Hereinafter, a process of storing data by the video search system 1 according to this exemplary embodiment will be described with reference to FIGS. 11 and 12.

The controller 11b of the video search device 10 receives metadata from the image management apparatus 20, the camera 30, and/or a separate VA engine (S1101). The updating unit 111a of the video search device 10 analyzes the metadata whenever it is received, to extract feature information on an object included in the video. Then, the updating unit 111a updates the event object information 122a based on the extracted feature information on the object in real-time, and writes it in the storage 12b (S1102 and S1201).

As described above, whenever the feature information on an object is newly extracted from the metadata, the event object information 122a is updated to include the feature information. The comparing unit 112a compares the newly extracted feature information with the event object information 122a that was previously stored in the storage 12b (S1103 and S1202). Preferably, the comparing unit 112a receives the newly extracted feature information directly from the updating unit 111a, and loads only the previously stored event object information 122a from the storage 12b for comparison. Since the newly extracted feature information on the object need not go through the storage 12b, time can be further saved. It is, however, to be understood that the present disclosure is not limited thereto. That is, the event object information 122a may be updated to include the newly extracted feature information, and the comparing unit 122a may load both the newly extracted feature information and the previously stored event object information 122a to compare them with each other. The event object information 122a stored in the storage 12b may be automatically deleted periodically. The comparing unit 112a may not operate until the event object information 122a written in the storage 12b becomes equal to a specific data size or until a specific period elapses.

The comparing unit 112a determines the similarity between the event object information 122a that was previously stored in the storage 12b and the newly extracted feature information on objects (S1203). In addition, the object information generating/deleting unit 113a selects an object having a high degree of similarity between the event object information 122 and the newly extracted feature information, creates or updates the final object information 123 based on information on the selected object (e.g., one or more attribute items extracted from the newly extracted feature information), and stores the final object information 123 (S1105 and S1204). A high degree of similarity means that there are many attribute items that match between the event object information 122a that was previously stored in the storage 12b and the newly extracted feature information. On the contrary, a low degree of similarity means that there are a few attribute items that match between the event object information 122a that was previously stored in the storage 12b and the newly extracted feature information. Although a different criterion may be used, it is desired that the degree of similarity is determined to be high if more than 80% attribute items match.

Some of the elements according to the exemplary embodiment shown in FIG. 11 that are similar to those described above with reference to FIG. 9 will not be described here in detail. It is to be understood that the elements may be modified slightly in accordance with various exemplary embodiments. Such modifications could easily be practiced by one skilled in the art after reading the specification and the accompanying drawings.

Figure 13:
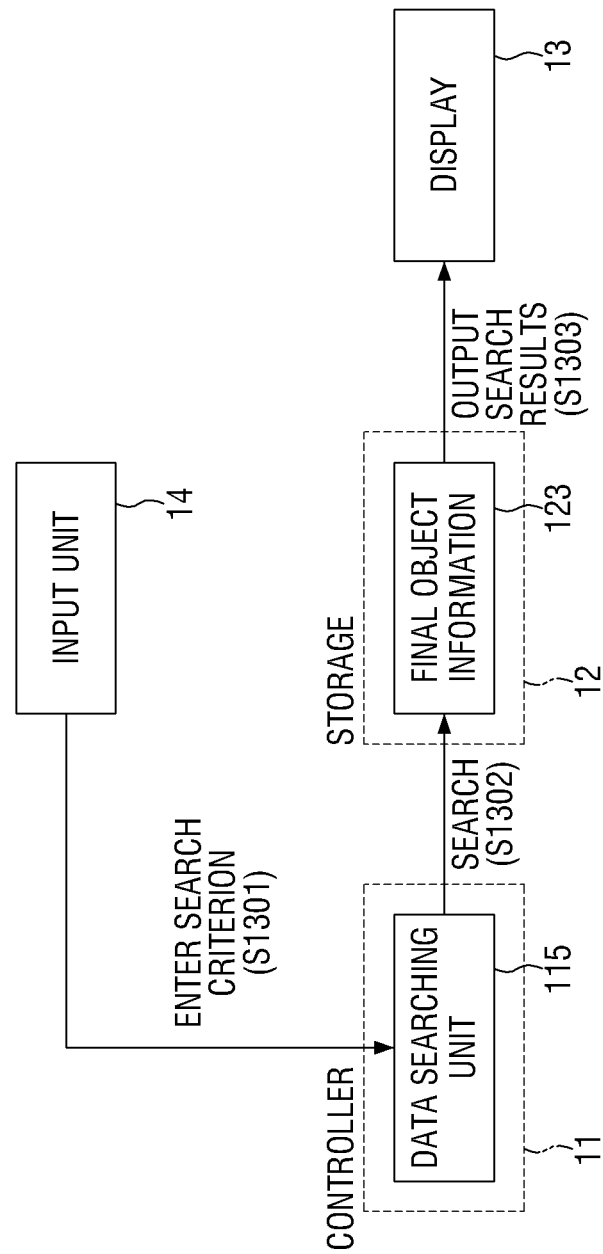
FIG. 13 is a diagram illustrating an operation flow of searching a video by the video search system 1 according to an exemplary embodiment.

FIG. 13 is a diagram illustrating an operation flow of searching videos by the video search system 1 according to an exemplary embodiment.

As described above, the final object information 123 may include attribute items, such as channel numbers, dates, times, object IDs, etc. Accordingly, a user can easily search for videos acquired from a plurality of channels by using information about a specific object and/or a specific channel as a search criterion. In other words, a database may be established based on the final object information 123 such that a user can search the entries of the final object information 123 to retrieve a particular entry from the database using one or more attribute items of the entry (e.g., channel number, date, time, object ID, etc.)

Specifically, as shown in FIG. 13, when a user enters search criterion with the input unit 14 to search for a video (S1301), the data searching unit 115 of the controller 11 searches the final object information 123 stored in the storage 12 to derive search results (S1302).

Although not shown in the drawings, a representative image for each of the videos may be stored in the storage 12 to further reduce the size of a database established in the storage 12 (i.e., the amount of data managed by the database). This is because the video streaming data has a large data size, while the representative image has a much smaller data size than the video streaming data. In this case, the video streaming data may be stored in the video management device 20, not in the storage 12. Preferably, the representative image may display at least one object included in the corresponding video.

The derived search results are displayed on the display 13 so that the user can see it (S1303). As the search results, the representative images of various videos can be displayed on the display as thumbnails. Once the user selects a representative image, the video streaming data corresponding to the selected representative image may be loaded from the video management device 20. Then, the video is displayed on the display 13.

According to an exemplary embodiment, when a user does not know the object ID of the object that he/she wants to monitor, the user may enter a specific channel and a specific time in which the object of interest is likely to appear as a search criterion. Thereby, the user can check the list of all objects that have appeared in the channel and at the time. For example, as results of the search, the object IDs of all the objects appearing in the channel and time may be displayed on the display 13 in chronological order or in frequency order, along with the representative images. As such, the user may identify the object ID of the object of interest from among the displayed representative images.

In doing so, the user may sort out an object that is determined, by the comparing unit 112a, to be similar to a reference object set in the comparison object information and thus has assigned the identical object ID with the reference object, but is actually not identical. For example, if the user determines that some objects have the same object IDs but are different on the representative images, the user may select the representative images she/he wants to exclude in a predetermined manner to remove them from the final object information 123a, or may remove the object during a process of playing back, which will be described below. In this way, the user may verify the information on the similar objects which are already determined by the comparing unit 112a, and the accuracy of search can be further improved. Subsequently, the user may perform search by entering the identified object ID as a search criterion.

Alternatively, if the user initially enters an object ID as a search criterion, the channels, dates, and times associated with appearances of the object corresponding to the object ID may be displayed on the display as the search results. Accordingly, the user can check the information on the channel, the date and the time at once, without repeating the search while changing the channels one by one to spot the object of interest.

When the user wants to play back videos corresponding to the search results, the video streaming data associated with the object ID for each channel is loaded from the video management device 20. To this end, a separate playback processor may be provided. The video streaming data of different channels may be stored at different locations in the video management device 20. Accordingly, the playback processor may load the video streaming data stored for each of the channels with respect to a particular object ID, decode it to create a plurality of streaming videos, and display them on the display 13.

The plurality of videos may be sequentially displayed on the display unit 13 in chronological order. Alternatively, a screen of the display 13 may be divided into sub-screens according to the number of the streaming videos, so that the sub-screens display the videos, respectively. As a result, a plurality of streaming videos can be displayed simultaneously. A time slider for integrally controlling the playback of the plurality of streaming videos may be displayed together with the plurality of videos.

The user may integrally control the playback time points of the plurality of videos using the time slider. In addition, the time slider may be configured for each of the plurality of videos so that the user can integrally control the plurality of videos and can also individually control the videos. Although the streaming videos are played sequentially or simultaneously in the foregoing description, it is to be understood that the streaming videos may be synthesized into a single streaming video and played sequentially. In such case, the time slider may be divided by the playback time points of the streaming videos. As such, the plurality of videos may be displayed on the display 13 in a variety of ways.

Assume that the user searches the final object information 123 of FIG. 7 based on time and channel number. If the user enters 'channels 2 and 4, from 3:00 to 5:00 on Nov. 16, 2016' as the search criteria, then the videos captured by the camera 30 of channels 2 and 4 from 3:00 to 5:00 and the object IDs of the objects included in the videos are derived as the search results. Specifically, the object having the object ID of 2 in channel 2 at 3:33:20, and the object having the object ID of 1 in channel 4 at 4:01:05 will be derived as the search results. In addition, the representative images of the videos belonging to the times and the channels may be displayed on the display 13 as thumbnails. The user can identify whether the object ID of the object of interest is 1 or 2 from the representative images. Subsequently, the user may perform searching again by entering the identified object ID as a search criterion.

Alternatively, if a user enters 'object ID 2, from 3:00 to 5:00 on Nov. 16, 2016' as the search criterion, the channel numbers of the camera 30 that captured the object having the object ID 2 from 3:00 to 5:00 may be derived as search results. That is to say, channel 2 at 3:33:20 and channel 3 at 4:03:03 are derived as the search results. When the user selects video playback through a predetermined input manner, the two videos may be loaded from the video management device 20. Then, the loaded videos are displayed on the display 13.

It will be evident to those skilled in the art that various modifications and changes may be made in the exemplary embodiments of the present disclosure without departing from the technical idea or the gist of the inventive concept. Therefore, it should be understood that the above-mentioned embodiments are not limiting but illustrative in all aspects. It should be understood that the drawings and the detailed description are not intended to limit the inventive concept to the particular forms disclosed herein, but on the contrary, the intention is to cover all modifications, equivalents, and alternatives falling within the spirit and scope of the inventive concept as defined by the appended claims.

What is claimed is:

1. A video search device comprising:
   at least one processor configured to implement an updater which generates event object information based on feature information on at least one object detected in a video; and
   a storage configured to store comparison object information containing feature information on at least one reference object,
   wherein the processor is further configured to implement:
   an object information generator/deleter configured to generate information on a first object, among the at least one object, having a predetermined degree of similarity between the event object information and the comparison object information as final object information, and storing the final object information in the storage; and
   a data searcher configured to search the final object information for data that satisfies a search criterion entered by a user,
   wherein the object information generator/deleter is further configured to store information on a second object, among the at least one object, having a similarity lower than the predetermined degree in the storage as temporary object information,
   wherein, based on determining that the temporary object information satisfies a predetermined criterion, the updater is configured to update the final object information based on the temporary object information,
   wherein whether the first object and the second object have the predetermined degree of similarity is determined by comparing feature information on the first object and the second object with the feature information on the at least one reference object,
   wherein whether the temporary object information satisfies the predetermined criterion is determined based on another information on the second object which is not included in the feature information on the second object, and
   wherein the predetermined criterion comprises a frequency at which the second object appears, or a frequency at which the second object takes a given action which is detected through video analysis of the video.

2. The device of claim 1, wherein a number of attribute items included in the final object information is smaller than a number of attribute items included in the event object information.

3. The device of claim 1, wherein the at least one processor is further configured to implement a counter configured to determine whether the temporary object information satisfies the predetermined criterion.

4. The device of claim 1,
   wherein at least one attribute item defined by the feature information on the at least one object is different from an attribute item defined by the other information on the second object.

5. The device of claim 3, wherein, based on determining that the temporary object information satisfies the predetermined criterion, the updater is further configured to update the comparison object information based on the temporary object information.

6. The device of claim 3, wherein, based on determining that the temporary object information fails to satisfy the predetermined criterion for a predetermined time, the object information generator/deleter is configured to delete the temporary object information.

7. The device of claim 1, wherein the storage is further configured to store a representative image for the video.

8. The device of claim 7, further comprising:
a display configured to display a video derived as search results when the data searcher searches for the data,
wherein the display is configured to display the representative image associated with the video as thumbnails.

9. A data storing method comprising:
generating event object information comprising a plurality of entries each of which comprises a plurality of attribute items of an object detected in a video;
comparing the event object information with comparison object information comprising feature information on a reference object;
selecting at least one entry, from among the plurality of entries, of which attribute items have at least a predetermined degree of similarity to the feature information on the reference object;
generating final object information in which at least one attribute item from among the attribute items of the at least one entry is associated with an identifier of the reference object;
establishing a database based on the final object information such that the at least one entry can be retrieved from the database by the at least one attribute item or the identifier of the reference object;
storing information on an object having a similarity lower than the predetermined degree in a storage as temporary object information, and
updating the final object information based on the temporary object information, based on determining that the temporary object information satisfies a predetermined criterion,
wherein whether the object has the predetermined degree of similarity is determined by comparing feature information on the object with the feature information on the reference object,
wherein whether the temporary object information satisfies the predetermined criterion is determined based on another information on the object which is not included in the feature information on the object, and
wherein the predetermined criterion comprises a frequency at which the object appears, or a frequency at which the object takes a given action which is detected through video analysis of the video.

10. The method of claim 9, wherein a number of the at least one attribute item included in the final object information is smaller than a number of the attribute items included in the event object information.

11. The method of claim 9, further comprising:
generating the temporary object information based on another entry, from among the plurality of entries, of which attribute items have a less similarity to the feature information on the reference object than the predetermined degree.

12. The method of claim 11, further comprising:
updating the final object information to include at least one attribute item of the other entry, based on determining that the temporary object information satisfies a predetermined criterion.

13. The method of claim 9, further comprising:
searching the final object information for data if a search criterion is entered.

14. A data storing device comprising:
at least one processor to implement an updater configured to extract feature information on at least one object included in a video, and generate event object information based on the extracted feature information; and
a storage configured to store the event object information,
wherein the processor is further configured to implement:
a comparer configured to compare the extracted feature information with event object information already stored in the storage; and
an object information generator/deleter configured to generate final object information based on information on a first object, among the at least one object, having a predetermined degree of similarity between the extracted feature information and the event object information, and store the final object information in the storage,
wherein the object information generator/deleter is further configured to store information on a second object, among the at least one object, having a similarity lower than the predetermined degree in the storage as temporary object information,
wherein, based on determining that the temporary object information satisfies a predetermined criterion, the updater is configured to update the final object information based on the temporary object information,
wherein whether the first object and the second object have the predetermined degree of similarity is determined by comparing feature information on the first object and the second object with feature information on at least one reference object,
wherein whether the temporary object information satisfies the predetermined criterion is determined based on another information on the second object which is not included in the feature information on the second object, and
wherein the predetermined criterion comprises a frequency at which the second object appears, or a frequency at which the second object takes a given action which is detected through video analysis of the video.

15. The device of claim 14,
wherein a number of attribute items included in the final object information is smaller than a number of attribute items included in the event object information.

16. The device of claim 14, wherein the at least one processor is configured to implement a data searcher configured to search the final object information for data that satisfies a search criterion entered by a user.

17. The device of claim 14,
wherein at least one attribute item defined by the feature information on the at least one object is different from at least one attribute item defined by the other information on the second object.

* * * * *